United States Patent
Sowa et al.

(10) Patent No.: US 8,948,378 B2
(45) Date of Patent: Feb. 3, 2015

(54) METHOD AND DEVICE FOR REKEYING IN A RADIO NETWORK LINK LAYER ENCRYPTION SYSTEM

(71) Applicant: Motorola Solutions, Inc., Schaumburg, IL (US)

(72) Inventors: Hans C. Sowa, Schaumburg, IL (US); Thomas J. Senese, Schaumburg, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 181 days.

(21) Appl. No.: 13/676,612

(22) Filed: Nov. 14, 2012

(65) Prior Publication Data

US 2013/0223622 A1 Aug. 29, 2013

Related U.S. Application Data

(60) Provisional application No. 61/603,604, filed on Feb. 27, 2012.

(51) Int. Cl.
*H04K 1/10* (2006.01)
*H04W 12/04* (2009.01)
(Continued)

(52) U.S. Cl.
CPC ......... *H04W 12/04* (2013.01); *H04L 29/06149* (2013.01); *H04L 9/30* (2013.01); *H04L 9/0822* (2013.01); *H04L 9/0891* (2013.01); *H04L 2463/062* (2013.01)
USPC .......................................................... 380/33

(58) Field of Classification Search
CPC ....... H04L 9/0822; H04L 9/0891; H04L 9/30; H04L 2463/062; H04L 29/06149
USPC .......................................................... 380/33
See application file for complete search history.

(56) References Cited

U.S. PATENT DOCUMENTS

| 7,907,733 B2 | 3/2011 | Cho et al. |
| 8,195,956 B2 | 6/2012 | Bilodi |

(Continued)

FOREIGN PATENT DOCUMENTS

| EP | 2517400 A2 | 10/2012 |
| WO | 2004030294 A1 | 4/2004 |

(Continued)

OTHER PUBLICATIONS

Tiaieia Standard; Project 25; Digital Radio Over-The-Air Rekeying (OTAR) Protocol; Apr. 12, 2001; 216 Pages.

(Continued)

*Primary Examiner* — Krisna Lim
(74) *Attorney, Agent, or Firm* — Daniel R. Bestor

(57) ABSTRACT

Disclosed is a method of rekeying radios for link layer encryption (LLE) in a radio network using a bifurcated crypto period. During a first portion of a first LLE crypto period during which a first LLE key (LEK) is used to LLE encrypt communications between a base station and mobile stations operating within a corresponding coverage area of the base station, a radio network communications device prevents individual ones of the mobile stations from requesting a second LEK to be used during a second LLE crypto period after the first LLE crypto period. During a second portion of the first LLE crypto period, the radio network communications device allows individual ones of the mobile stations to request the second LEK. A mobile station configured to operate in accordance with the bifurcated crypto period, and provide information regarding keys in its possession via an authentication response ISP, is also disclosed.

23 Claims, 10 Drawing Sheets

(51) Int. Cl.
  *H04L 29/06* (2006.01)
  *H04L 9/30* (2006.01)
  *H04L 9/08* (2006.01)

(56) References Cited

U.S. PATENT DOCUMENTS

| | | |
|---|---|---|
| 8,306,229 B2 | 11/2012 | Pang et al. |
| 8,369,529 B1 | 2/2013 | Agarwal et al. |
| 2005/0047598 A1 | 3/2005 | Kruegel |
| 2006/0133614 A1 | 6/2006 | Zhang et al. |
| 2007/0223703 A1 | 9/2007 | Verma et al. |
| 2007/0253554 A1* | 11/2007 | Chesson et al. ............... 380/273 |
| 2009/0034736 A1* | 2/2009 | French ........................... 380/278 |
| 2009/0103724 A1* | 4/2009 | Tamai ............................. 380/44 |
| 2010/0020974 A1 | 1/2010 | Tsai et al. |
| 2011/0096929 A1 | 4/2011 | Seleznev |
| 2011/0135097 A1 | 6/2011 | Redfern et al. |
| 2011/0150223 A1 | 6/2011 | Qi et al. |
| 2013/0243195 A1* | 9/2013 | Kruegel et al. ............... 380/270 |

FOREIGN PATENT DOCUMENTS

| | | |
|---|---|---|
| WO | 2006132512 A1 | 12/2006 |
| WO | 2009120711 A2 | 10/2009 |
| WO | 2009142785 A2 | 11/2009 |

OTHER PUBLICATIONS

PCT International Search Report Dated Jun. 5, 2013 for Counterpart Application PCT/US2013/027419.

Notice of Allowance mailed Jan. 28, 2014 in U.S. Appl. No. 13/678,747, Chris A. Kruegel, filed Nov. 16, 2012.

PCT International Search Report Dated May 30, 2013 for Counterpart Application PCT/2013/025549.

Hung-Min Sun, et al. An Efficient Rekeying Scheme for Multicast and Broadcast (M&B) in Mobile WiMAX; 2008 IEEE Asia-Pacific Services Computing Conference.

Matthew Ginley, et al. "Efficient and Secure Multicast in Wirelessman", 2007 IEEE.

* cited by examiner

METHOD AND DEVICE FOR REKEYING IN A RADIO NETWORK LINK LAYER ENCRYPTION SYSTEM

FIELD OF THE DISCLOSURE

The present disclosure relates to a processor, a method, and a device for rekeying in a radio network supporting link layer encryption (LLE) and/or decryption.

BACKGROUND

Wireless communication systems provide for radio communication links to be arranged within the system between a plurality of user terminals. Such user terminals may be mobile and may therefore be known as 'mobile stations.' At least one other terminal, e.g. used in conjunction with mobile stations, may be a fixed terminal, e.g. a control terminal, base station, or access point. Such a system typically includes a system infrastructure which generally includes a network of various fixed installations such as base stations, which are in direct radio communication with the mobile stations. Each of the base stations operating in the system may have one or more transceivers which may, for example, serve mobile stations in a given local region or area, known as a 'cell' or 'site', by radio frequency (RF) communication. The mobile stations which are in direct communication with a particular base station are said to be served by the base station, and all radio communications to and from each mobile station within the system are made via respective serving base stations. Sites of neighbouring base stations in a wireless communication system may be offset from one another or may be overlapping.

Wireless communication systems may operate according to an industry standard protocol such as, for example, the Project 25 (P25) standard defined by the Association of Public Safety Communications Officials International (APCO), or other radio protocols. Further details regarding the P25 standards can be obtained from the Telecommunications Industry Association, 2500 Wilson Boulevard, Suite 300 Arlington, Va. Communications in accordance with P25 or other standards may take place over physical channels in accordance with one or more of a TDMA (time division multiple access) protocol, a FDMA (frequency divisional multiple access), or CDMA (code division multiple access) protocol. Mobile stations in wireless communication systems such as P25 systems send user communicated speech and data, herein referred to collectively as 'traffic information', in accordance with the designated protocol.

Many wireless communication systems, including many P25 systems, employ a procedure to encrypt sensitive communicated traffic information, especially where the information is sent via insecure channels, e.g. by wireless communication over-the-air. For example, in some wireless communication systems, communications can be end-to-end encrypted. This means that encryption of traffic information is applied by an original transmitting terminal of the sender (source) of the traffic information and removed by a final receiving terminal of the recipient (destination) of the traffic information. Intermediate terminals that facilitate the delivery of the encrypted traffic information are unable to decrypt the encrypted traffic information (or at least, are unable to do so in a reasonable amount of time).

In addition to end-to-end encryption, link layer encryption (LLE) may additionally be used between individual links in a path from a source transmitter to a destination receiver to further prevent the interception or monitoring of traffic information transmitted over-the-air, such as between mobile stations and base stations. For example, even when end-to-end encryption is used to encrypt digitized voice data, some control and/or signalling data is necessarily sent unencrypted over-the-air to allow the receiving device (such as the base station or mobile station) to identify a sender or receiver, talkgroup ID, or to obtain information such as an algorithm ID or key ID sufficient to begin decrypting the end-to-end encrypted voice data. LLE may be used, for example, to encrypt over-the-air communication links between mobile stations and base stations, and advantageously prevent an eavesdropper from intercepting information transmitted over-the-air, such as group ID's, transmitter ID's, target ID's, algorithm IDs, key IDs, or other control information.

FIG. 1 illustrates an example of how encryption may be achieved between a transmitter 101 and receiver 103 over an intervening channel 105 (e.g., air-interface) by producing a random or pseudo-random data sequence of binary digits (e.g., an encryption initialization vector 111) and using a combining procedure (e.g., an encryption algorithm 115) to combine the encryption initialization vector 111 with a secret key variable 113 supplied by the user. The combination generates another data sequence, known as a keystream, incorporating the secret key variable 113. The keystream, or a portion of it, is then used internally by the encryption algorithm 115 to encrypt the user traffic information 117 to be transmitted in encrypted form as encrypted traffic information 133. This is done in an encryption processor by using a combination procedure, such as an XOR (exclusive OR) combination procedure, to combine the unencrypted traffic information 117 with the keystream, e.g. on a frame-by-frame basis. The encryption initialization vector 111 may be loaded into a linear feedback shift register (LFSR), for example, and may be clocked to provide a time-varying keystream.

The secret key variable 113 used at the transmitter 101 is known at the receiver 103 and is thus never transmitted openly (e.g., unencrypted). The receiver 103 is sent the encryption initialization vector 111, an identifier identifying the encryption algorithm 115 used at the transmitter 101 (assuming it is not hardcoded in both transmitter 101 and receiver 103), and an identifier identifying the key variable 113 used at the transmitter 101 (assuming it is not hardcoded in both transmitter 101 and receiver 103) via a sync block 131 transmitted over the channel 105 and included in one or more of a header information structure or embedded in a data payload frame. The transmitter 101 also transmits the encrypted traffic information 133 over the channel 105 for reception by the receiver 103. The receiver 103 is thereby able to re-construct the keystream applied at the transmitter 101. The receiver 103 combines the reconstructed keystream with the encrypted traffic 133 it receives in a manner such that the keystream included in the encrypted traffic 133 is cancelled allowing the original user traffic 163 to be extracted in unencrypted form. For example, the receiver 103 may use a same clocked LFSR as used by the transmitter 101 to provide a same time-varying keystream using the retrieved encryption initialization vector 111 transmitted in the sync block 131.

The encryption/decryption process therefore typically includes (i) operation of an encryption algorithm in a processor of a transmitting terminal to encrypt the information to be transmitted, and (ii) operation of a related decryption algorithm in a receiving terminal to decrypt the received encrypted traffic information.

Because an LLE encryption key can, given enough time and computing power, be brute-force decoded by an intercepting device, many LLE encryption/decryption processes incorporate a rekeying procedure in which the shared key used by the transmitter and receiver to encrypt and decrypt communications will be periodically changed. A period during which a particular shared key is used to encrypt and decrypt communications (between one or more transmitting devices and one or more receiving devices) may be referred to as an LLE crypto period. For example, at a predetermined period in time, an authentication controller in a radio network may decide to switch from a current shared key to a new shared key. When this occurs, however, a number of individual rekey requests generated by mobile stations seeking the new shared key (in order to LLE decrypt communications encrypted with the shared key) can overwhelm the authentication controller and/or the over-the-air bandwidth available to transmit what may be a significant amount of data (new shared keys to each requesting mobile station).

Established air-interface protocols such as P25 may not provide sufficient available over-the-air bandwidth to satisfy each of the individual rekey requests without incurring substantial delays and/or performance degradation. Furthermore, such established air-interface protocols may not provide a means for the authentication controller to determine which, and how many out of a total number of currently operating (or previously operating), mobile stations have both the current LLE key and the future LLE key. Accordingly, what is needed is an improved method, device, and system for rekeying that can aid in reducing over-the-air bandwidth requirements, preventing substantial delays and performance degradation, and allows for more intelligent distribution of new shared keys.

DETAILED DESCRIPTION

It would be advantageous to introduce a radio system, method, and device for rekeying LLE keys, applicable to air-interface protocols such as P25, that reduces over-the-air bandwidth requirements, prevents substantial delays and performance degradation, and more intelligently distributes new shared keys. In addition, it would be advantageous to introduce a radio system, method, and device for a mobile station to indicate to an authentication controller which shared LLE keys it currently has in its possession, so that the authentication controller can more intelligently distribute keys and correspondingly adjust LLE crypto period portion lengths.

In one example, a method of rekeying radios for LLE in a radio network includes, at a radio network communications device: during a first portion of a first LLE crypto period during which a first LLE key (LEK) is used to LLE encrypt inbound and outbound communications between a base station and mobile stations operating within a corresponding coverage area of the base station, preventing individual ones of the mobile stations from requesting a second LEK to be used during a second LLE crypto period after the first LLE crypto period, and during a second portion of the first LLE crypto period, allowing individual ones of the mobile stations to request the second LEK.

In another example, a method of rekeying radios for LLE in a radio network includes, at a mobile station: during a first portion of a first LLE crypto period during which a first LEK is used to LLE encrypt inbound and outbound communications between a base station and the mobile station operating within a corresponding coverage area of the base station, refraining from requesting a second LEK to be used during a second LLE crypto period after the first LLE crypto period, and during a second portion of the first LLE crypto period, and responsive to determining that the mobile station was not pre-provisioned with the second LEK and was not provided the second LEK during the first portion of the first LLE crypto period, transmitting an individual request for the second LEK over an air interface to the base station.

Each of these embodiments will be discussed in more detail below, starting with example network and device architectures of the system in which the embodiments may be applied, followed by a discussion of bifurcated LLE crypto periods in general, and then from the viewpoint of the authentication controller and the mobile station.

I. Network and Device Architecture

Figure 1:
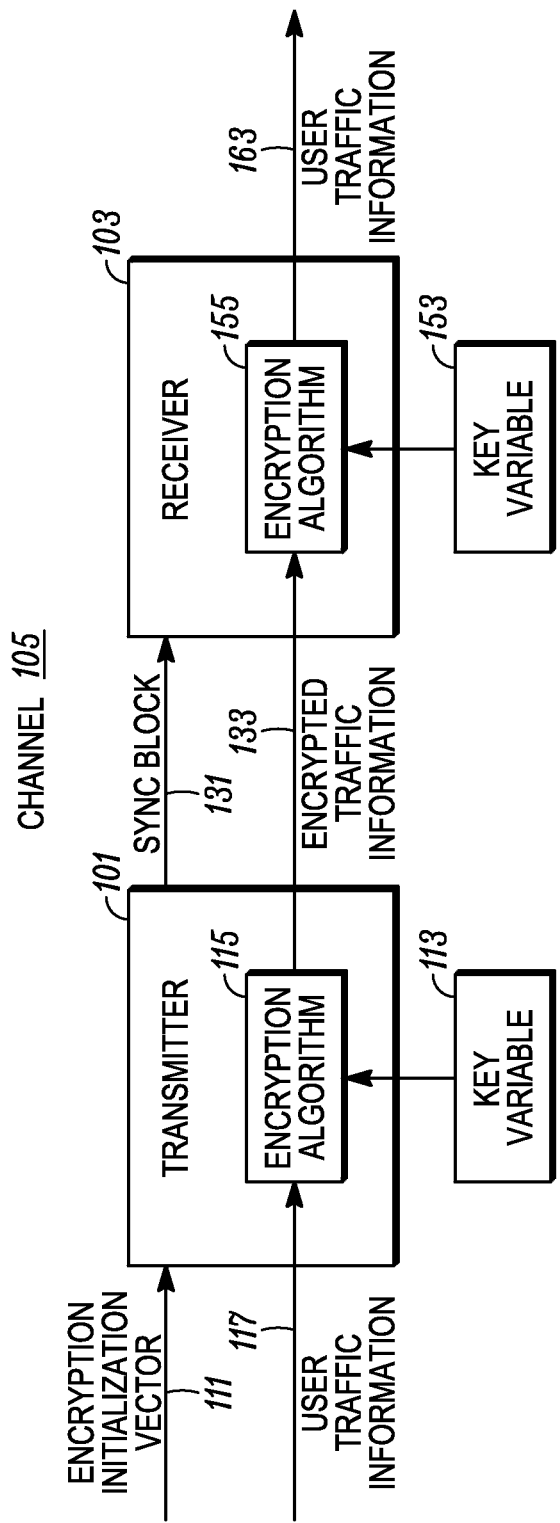
FIG. 1 is a block diagram illustrative of a conventional encryption/decryption system.
Figure 2:
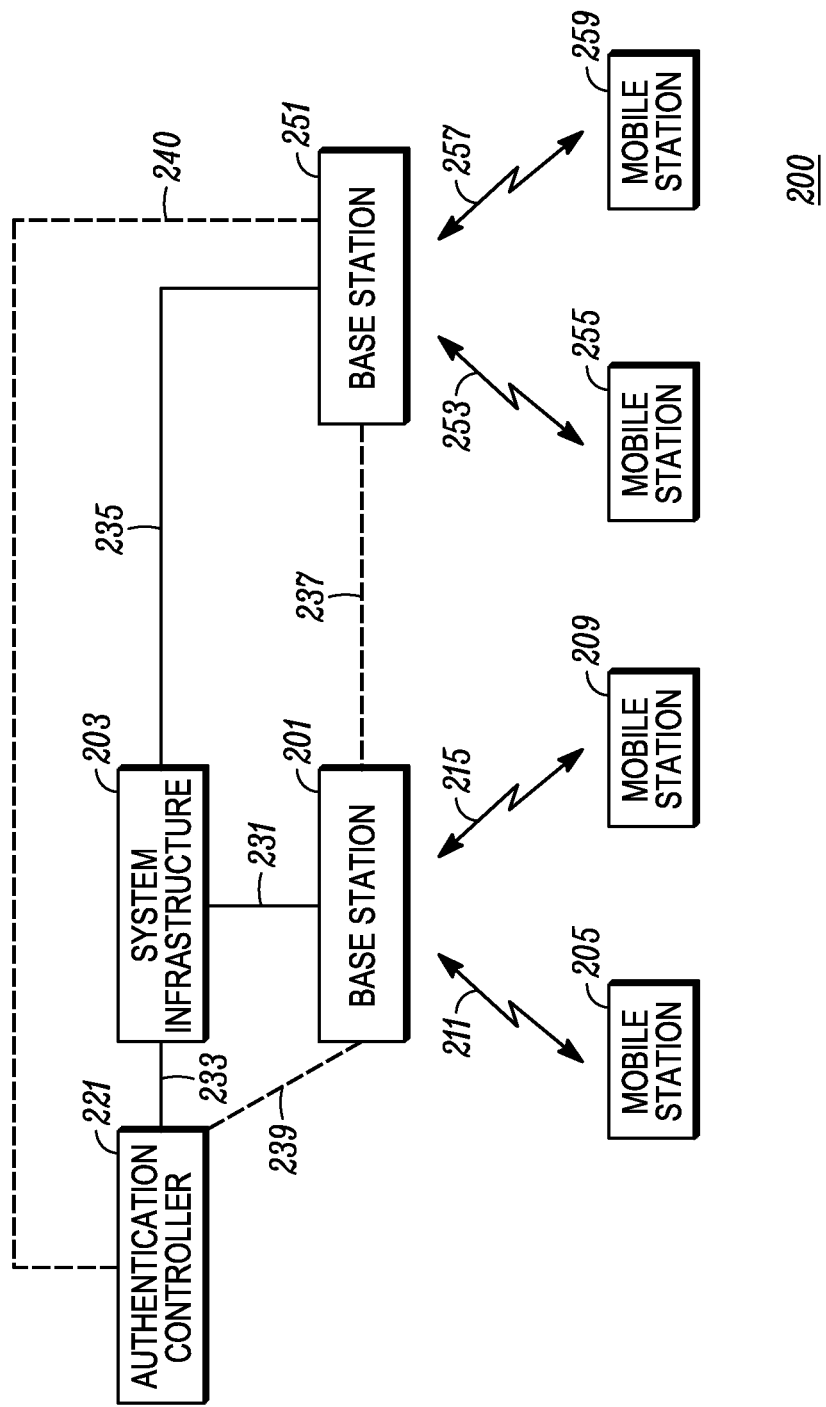
FIG. 2 is a schematic diagram of a wireless communication system in accordance with an embodiment.

FIG. 2 shows a wireless radio communication system 200 which may be adapted in accordance with an embodiment of the disclosure. It will be apparent to those skilled in the art that the system 200 and the components which are to be described as operating therein may take a number of forms well known to those skilled in the art. Thus, the layout of the system 200, and of its operational components to be described, should be regarded as illustrative rather than limiting. The system 200 of FIG. 2 will be described as an illustrative wireless communication system such as a system capable of operating in accordance with the P25 standard, but may be equally applied to other currently known and/or future standards protocols, such as Digital Mobile Radio (DMR).

The system 200 shown in FIG. 2 includes one or more base stations 201, 251 operably connected to a system infrastructure 203 via respective wired or wireless links 231, 235. As used herein, the term "base station" (BS) refers to any entity that includes a transmitter and/or receiver to perform the functionality of receiving data (voice, images, video, text, etc.) from a signal source (e.g. mobile station 205) and transmitting it to one or more signal destinations (e.g. mobile station 209, mobile station 255, system infrastructure 203, etc.). For example, the BS 201 may comprise, among other possibilities, a cellular wireless base station, a two-way radio repeater, an IEEE 802-based wireless access points, or other similar devices.

The BS 201 has radio links with a plurality of mobile stations, particularly mobile stations (MSs) in a service cell or site at least partially defined by a geographic location of the BS 201. In addition to MSs, BS 201 may maintain a direct wireless or wired link 239 (or indirect via system infrastructure 203) with an authentication controller 221 or other radio network communications device including authentication services (such as a zone controller). While the authentication controller 221 is illustrated as a separate entity in the system 200, in other embodiments, the authentication controller 221 may be integrated with other devices (such as a zone controller) in system infrastructure 203 and/or may be integrated into one or more of BSs 201, 251. The authentication controller 221 may be configured to provide authentication services to BS 201 so that mobile stations operating within its coverage area may be authenticated via communications involving the authentication controller 221, BS 201, and mobile stations 205, 209. Two MSs 205, 209 are illustrated in FIG. 2 as being within the service area of, and being registered with, BS 201 via respective radio links 211, 215. The BS 201 thereby serves MSs including the MSs 205, 207 with radio communications to and from other terminals, including (i) MSs served by the BS 201, (ii) MSs served by other BSs such as BS 251, (iii) other terminals including MSs in other systems (not shown) operably linked to the system 200 via the system infrastructure 203, and (iv) a console (not shown).

BS 251 similarly has radio links with a plurality of MSs, particularly MSs in a service cell or site at least partially defined by a geographic location of the BS 251. In addition to MSs, BS 251 may maintain a direct wireless or wired link 240 (or indirect via system infrastructure 203) with the authentication controller 221 or other controller including authentication services (such as a zone controller). The authentication controller 221 may be configured to provide authentication services to BS 251 so that mobile stations operating within its coverage area may be authenticated via communications involving the authentication controller 221, BS 251, and mobile stations 255, 259. Two MSs 255, 259 are illustrated in FIG. 2 as being within the service area of, and being registered with, BS 251 via respective radio links 253, 257. The BS 251 thereby serves MSs including the MSs 255, 259 with radio communications to and from other terminals, including (i) MSs served by the BS 251, (ii) MSs served by other BSs such as BS 201, (iii) other terminals including MSs in other systems (not shown) operably linked to the system 200 via the system infrastructure 203, and (iv) a console (not shown).

The system infrastructure 203 includes known sub-systems (not shown) required for operation of the system 200. Such sub-systems may include, for example, sub-systems providing additional authentication, routing, MS registration and location, system management and other operational functions within the system 200. The system infrastructure 203 may also provide routes to other BSs (not shown) providing cells serving other MSs, and/or may provide access to other types of networks such as a plain old telephone system (POTS) network or a data-switched network such as the Internet. The system infrastructure 203 may also maintain a separate link 233 to the authentication controller 221 for allowing configuration of the authentication controller 221 (perhaps via a console, not shown).

Figure 3:
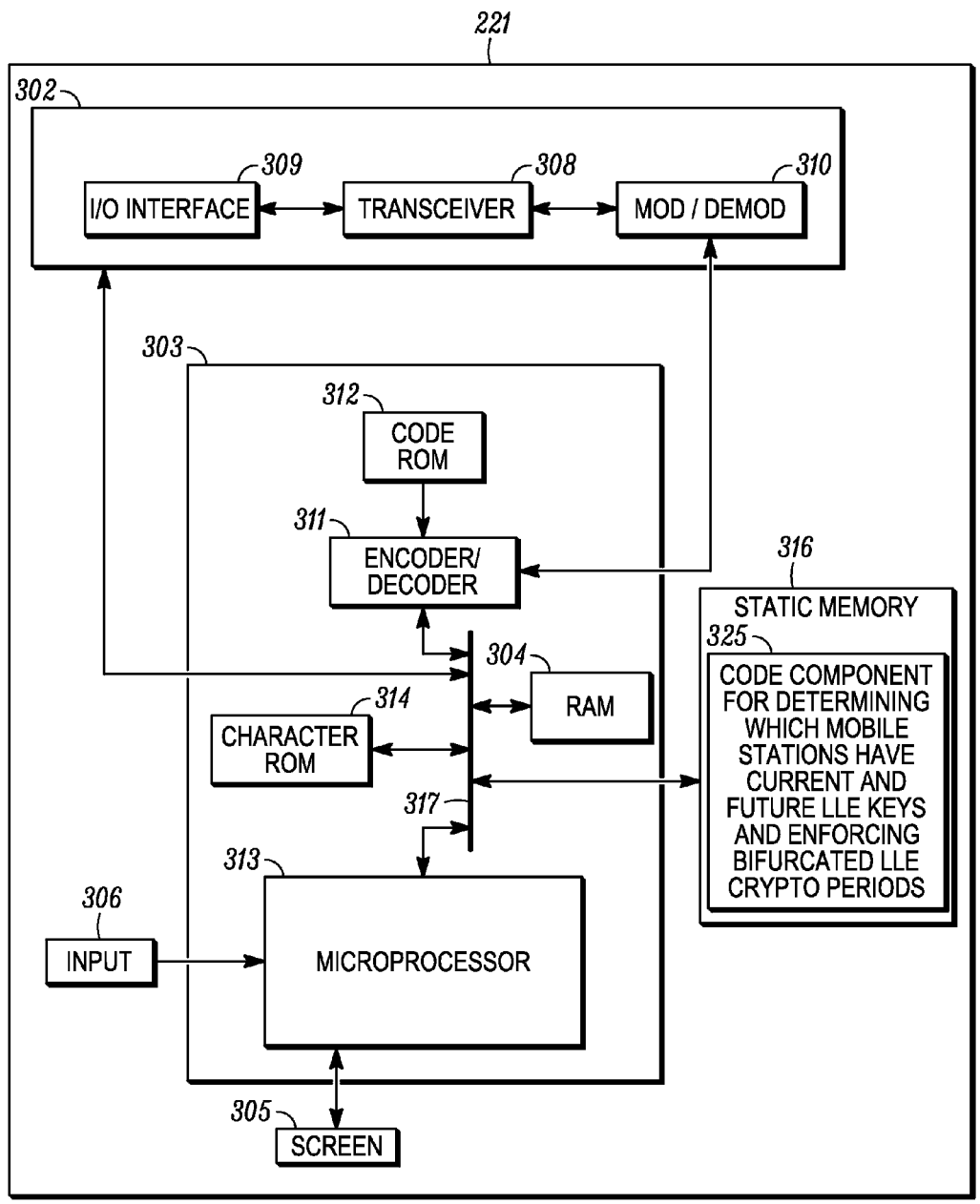
FIG. 3 is a block diagram of an illustrative layout of a base station of the system of FIG. 2 in accordance with an embodiment.

FIG. 3 is an example functional block diagram of a BS 201 operating within the system 200 of FIG. 2 in accordance with some embodiments. Other BSs such as BS 251 may contain same or similar structures. As shown in FIG. 3, BS 201 includes a communications unit 302 coupled to a common data and address bus 317 of a processing unit 303. The BS 201 may also include an input unit (e.g., keypad, pointing device, etc.) 306 and a display screen 305, each coupled to be in communication with the processing unit 303.

The processing unit 303 may include an encoder/decoder 311 with an associated code Read Only Memory (ROM) 312 for storing data for encoding and decoding voice, data, control, or other signals that may be transmitted or received between other BSs or MSs in the same radio site as BS 201, or perhaps between other BSs in a remote radio site such as BS 251. The processing unit 303 may further include a microprocessor 313 coupled, by the common data and address bus 317, to the encoder/decoder 311, a character ROM 314, a Random Access Memory (RAM) 304, and a static memory 316.

The communications unit 302 may include one or more wired or wireless input/output (I/O) interfaces 309 that are configurable to communicate with MSs such as MSs 205, 209, with other BSs such as BS 251, with the system infrastructure 203, and/or with the authentication controller 221. The communications unit 302 may include one or more wireless transceivers 308, such as a Digital Mobile Radio (DMR) transceiver, an APOCO P25 transceiver, a Bluetooth transceiver, a Wi-Fi transceiver perhaps operating in accordance with an IEEE 802.11 standard (e.g., 802.11a, 802.11b, 802.11g), a WiMAX transceiver perhaps operating in accordance with an IEEE 802.16 standard, and/or other similar type of wireless transceiver configurable to communicate via a wireless radio network. The communications unit 302 may additionally include one or more wireline transceivers 308, such as an Ethernet transceiver, a Universal Serial Bus (USB) transceiver, or similar transceiver configurable to communicate via a twisted pair wire, a coaxial cable, a fiber-optic link or a similar physical connection to a wireline network. The transceiver 308 is also coupled to a combined modulator/demodulator 310 that is coupled to the encoder/decoder 311.

The microprocessor 313 has ports for coupling to the input unit 306 and to the display screen 305. The character ROM 314 stores code for decoding or encoding data such as control channel messages and/or data or voice messages that may be transmitted or received by the BS 201. Static memory 316 may store operating code for the microprocessor 313 that, when executed, determines which mobile stations have current and future LLE keys and enforces bifurcated LLE crypto periods in accordance with FIGS. 6-9 and the accompanying text. Static memory 316 may comprise, for example, a hard-disk drive (HDD), an optical disk drive such as a compact disk (CD) drive or digital versatile disk (DVD) drive, a solid state drive (SSD), a tape drive, a flash memory drive, or a tape drive, to name a few.

Figure 4:
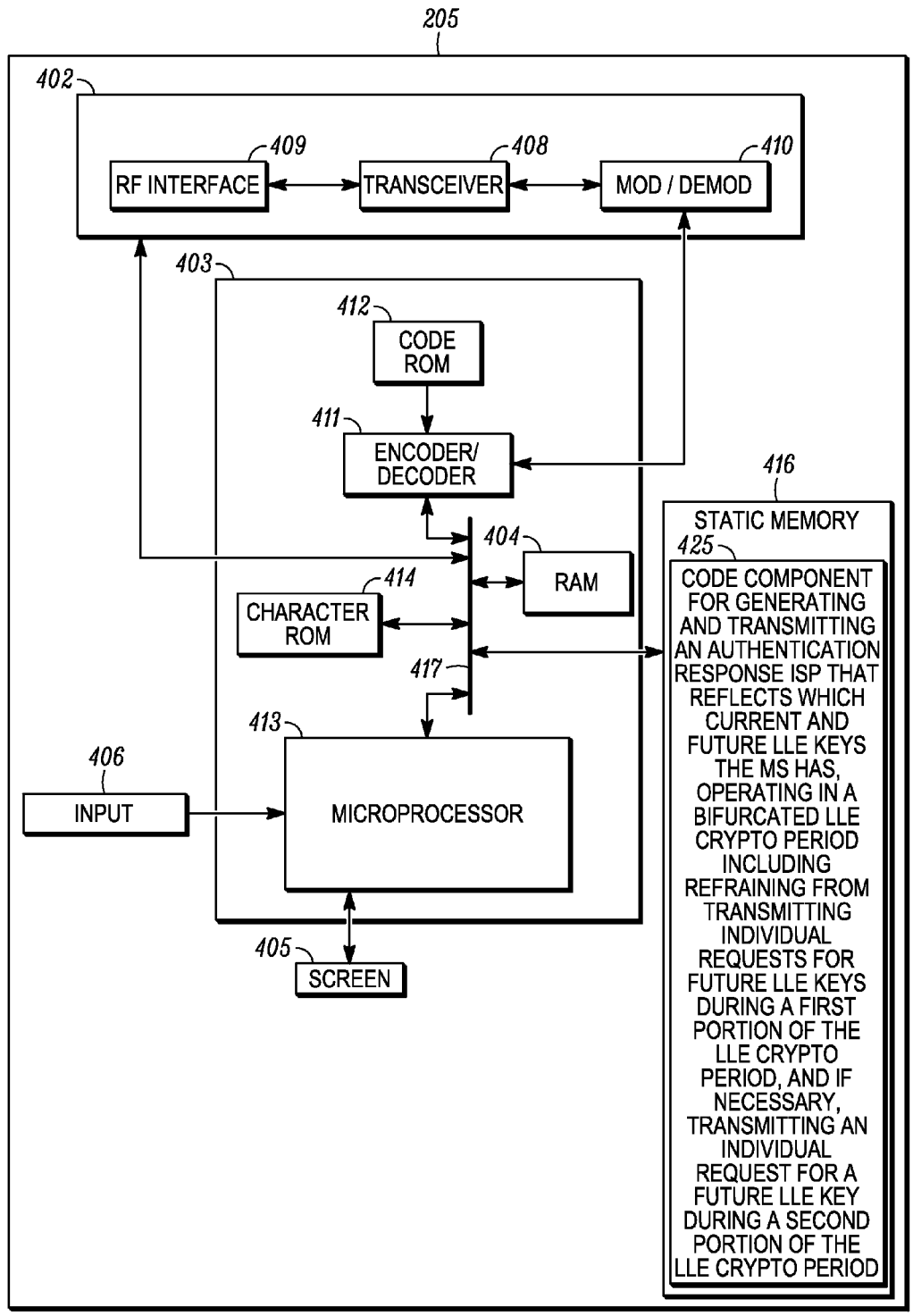
FIG. 4 is a block diagram of an illustrative layout of a mobile station of the system of FIG. 2 in accordance with an embodiment.

FIG. 4 is an example functional block diagram of a mobile station such as MS 205 operating within the system 200 of FIG. 2 in accordance with some embodiments. Other MSs such as MSs 209, 255, and 259 may contain same or similar structures. As shown in FIG. 4, MS 205 includes a communications unit 402 coupled to a common data and address bus 417 of a processing unit 403. The MS 205 may also include an input unit (e.g., keypad, pointing device, etc.) 406 and a display screen 405, each coupled to be in communication with the processing unit 403.

The processing unit 403 may include an encoder/decoder 411 with an associated code ROM 412 for storing data for encoding and decoding voice, data, control, or other signals that may be transmitted or received between other BSs or MSs in the same radio site as MS 205, or perhaps between other MSs in a remote radio site. The processing unit 403 may further include a microprocessor 413 coupled, by the common data and address bus 417, to the encoder/decoder 411, a character ROM 414, a RAM 404, and a static memory 416.

The communications unit 402 may include an RF interface 409 configurable to communicate with other MSs such as MSs 209, 255, 259 and with BSs such as BSs 201, 251. The communications unit 402 may include one or more wireless radio transceivers 408, such as a DMR transceiver, an APOCO P25 transceiver, a TETRA transceiver, a Bluetooth transceiver, a Wi-Fi transceiver perhaps operating in accordance with an IEEE 802.11 standard (e.g., 802.11a, 802.11b, 802.11g), a WiMAX transceiver perhaps operating in accordance with an IEEE 802.16 standard, and/or other similar type of wireless transceiver configurable to communicate via a wireless network. The transceiver 408 is also coupled to a combined modulator/demodulator 410 that is coupled to the encoder/decoder 411.

The microprocessor 413 has ports for coupling to the input unit 406 and to the display screen 405. The character ROM 414 stores code for decoding or encoding data such as control channel messages and/or data or voice messages that may be transmitted or received by the MS 205. Static memory 416 may store operating code for the microprocessor 413 that, when executed, generates and transmits an authentication response inbound signalling packet (ISP) that reflects which current and future LLE keys the MS has, and operates in a bifurcated LLE crypto period in which it refrains from transmitting individual requests for future LLE keys during a first portion of the LLE crypto period, and if necessary, transmits an individual request for a future LLE key during a second portion of the LLE crypto period in accordance with one or more of FIGS. 7-10 and corresponding text. Static memory 416 may comprise, for example, a HDD, an optical disk drive such as a CD drive or DVD drive, a SSD, a tape drive, a flash memory drive, or a tape drive, to name a few.

II. Bifurcated LLE Crypto Periods Generally

As set forth above, an authentication controller, such as authentication controller 221 of FIG. 2, may enforce bifurcated LLE crypto periods in order to aid in reducing over-the-air bandwidth requirements, preventing substantial delays and performance degradation, and more intelligently distributing new shared LLE keys.

Figure 5:
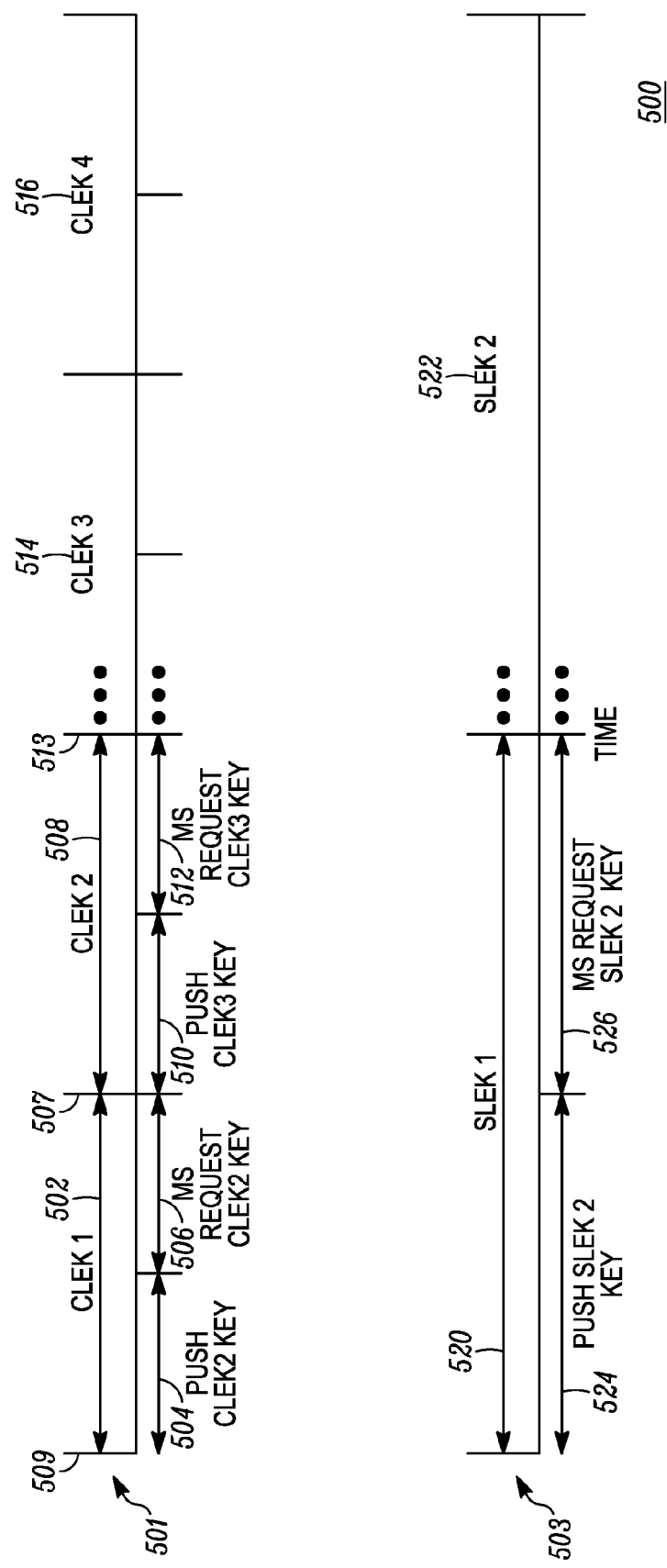
FIG. 5 is a timing diagram of LLE crypto periods in accordance with an embodiment.

FIG. 5 illustrates a timing diagram 500 of overlapping bifurcated LLE crypto periods for two LLE encryption keys. In the upper half 501 of the timing diagram 500, a common link layer encryption key (CLEK) LLE crypto period is illustrated. A CLEK is a key pair shared by the fixed network equipment (e.g., BS 201) and the mobile stations (e.g., MSs 205, 209) operating within the BS's coverage area, and is used to LLE encrypt the inbound and outbound air interface links (e.g., links 211, 215) between them, including control and header data, in order to prevent an intercepting device from determining information such as group ID's, source and/or target mobile station radio ID's, and other similar information included in control messages and/or header packets. BS 251 and mobile stations 255 and 259 may use the same CLEK or a different CLEK than BS 201 and MSs 205, 209. The CLEK may be generated at the authentication controller 221 and provided to the BSs 201, 251 and MSs 205, 209, 255, 259 periodically or upon request (e.g., at power-on or at authentication).

In a lower half 503 of the timing diagram 500, a static link layer encryption key (SLEK) LLE crypto period is illustrated as overlapping in time with the CLEK LLE crypto period illustrated in the upper half 501. An SLEK is a backup key pair shared by the fixed network equipment (e.g., BS 201) and the mobile stations (e.g., MSs 205, 209) operating within the BS's coverage area, and is used to LLE encrypt the air interface links (e.g., links 211, 215) between them, including control and/or header data, when connectivity is lost between the BSs 201, 251 and the system infrastructure 203 and/or between the BSs 201, 251 and the authentication controller 221. The SLEK, acting as a fall back key pair and used only when the wireless radio network 200 experiences some error condition, generally has a much longer LLE crypto period than the CLEK because it is intended to be used much less often, and thus should be less prone to attack and brute force decryption.

Although FIG. 5 illustrates two particular LLE crypto periods and associated example LLE crypto periods, variations of the LLE crypto periods illustrated could be tracked by authentication controller 221, and any other types of LLE (and their associated LLE crypto periods) could be tracked, including, for example, individual link layer key encryption key pairs (LKEKs) that are unique to each one of the particular ones of the MSs (and may be used to distribute the CLEK and/or SLEK to individual MSs) and group key link layer encryption key pairs (GKEKs) that are shared by a plurality of MSs to enable group key updates (and may be used to distribute the CLEK and/or SLEK to groups of MSs at a time).

As set forth in FIG. 5, two CLEK LLE crypto periods (CLEK1 502 and CLEK2 508) are set forth in detail, while two subsequent CLEK LLE crypto periods (CLEK3 514 and CLEK4 516) are illustrated simply to convey the repeating nature of the CLEK LLE crypto periods and their overlap with the SLEK LLE crypto periods. During a particular CLEK LLE crypto period, for example CLEK1 502, all communications between a particular BS (such as BS 201) and MSs being served by that BS, are encrypted with a first CLEK key pair associated with the CLEK1 LLE crypto period 502. During the CLEK1 LLE crypto period 502, the CLEK LLE key associated with that period is considered the "current CLEK key," and a CLEK LLE key associated with the next CLEK LLE crypto period CLEK2 508 is considered to be a "future CLEK key." A packet called a key announcement OSP transmitted by the BS may be used to inform MSs what CLEK key pair is associated with a particular current and/or future CLEK LLE crypto period.

During the CLEK1 LLE crypto period 502, since all communications between the MSs and the BS are encrypted using the associated current CLEK1 key pair, MSs not already in possession of the current CLEK key are configured to immediately request the key via the MS's serving BS. Such requests for the current CLEK key will, bandwidth and resource permitting, generally be fulfilled immediately, and may be provided to a requesting MS via an LKEK-encrypted unicast transmission to the requesting MS.

When the CLEK period rolls over from the first CLEK LLE crypto period CLEK1 502 to a second CLEK LLE crypto period CLEK2 508 at time period 507, however, all MSs operating in the coverage area of a BS, for example, may immediately request the new current CLEK key associated with the second CLEK LLE crypto period CLEK2 508. Individually fulfilling each of these requests via unicast LKEK-encrypted transmissions would consume substantial system resources. Accordingly, MSs may be configured to request the future CLEK key associated with CLEK LLE crypto period CLEK2 508 prior to the time period 507. However, this raises a similar problem in that, at time period 509, MSs that determine that they do not have the future CLEK key (associated with the CLEK LLE crypto period CLEK2 508) will similarly make individual requests for the future CLEK key, and fulfilling such request similarly consume substantial system resources.

In light of the foregoing, and in accordance with one embodiment, each CLEK LLE crypto period is bifurcated into a first LLE crypto period portion and a second LLE crypto period portion. During the first LLE crypto period portion, individual requests for the current CLEK key are fulfilled (system resource permitting), while individual requests for the future CLEK key are dropped or denied. For example, during the first portion 504 of CLEK LLE crypto period CLEK1 502, individual requests for the current CLEK key associated with CLEK LLE crypto period CLEK1 502 are fulfilled, while individual requests for the future CLEK key associated with CLEK LLE crypto period CLEK2 508 are dropped or denied. In most instances, the MSs will be configured to abide by these rules (so as not to request a future CLEK key during the first portion of the CLEK LLE crypto period, but to request the future CLEK key during the second portion of the CLEK LLE crypto period on an as-needed basis). In other instances, the authentication controller 221 may be configured to enforce the LLE crypto period portions by actively denying (transmitting a deny response message) or dropping individual requests for future CLEK keys received (by the authentication controller) or transmitted (by the MSs) during the first portion of the LLE crypto period.

Also during the first portion 504 of the first CLEK LLE crypto period CLEK1 502, the authentication controller 221 may be configured to transmit a group key update of the future CLEK key associated with CLEK LLE crypto period CLEK2 508. For example, authentication controller 221 may cause a BS under its control (such as BS 201 and/or BS 251 of FIG. 2) to transmit a GKEK-encrypted CLEK key associated with the second CLEK LLE crypto period CLEK2 508 via a broadcast or multicast transmission for receipt by a plurality (or all) of the MSs operating within the BS's coverage area. By using a group-transmission mechanism during the first portion 504 of the first CLEK LLE crypto period CLEK1 502, individual requests for the future CLEK key associated with the second CLEK LLE crypto period CLEK2 508 can be substantially minimized or avoided.

During the second portion 506 of the first CLEK LLE crypto period CLEK1 502, individual requests for the future CLEK key associated with the second CLEK LLE crypto period CLEK2 508 are allowed and fulfilled. For example, a MS (such as MS 205 of FIG. 2) that perhaps missed the group-transmission of the future CLEK key (during the first portion 504 of the first CLEK LLE crypto period CLEK1 502) or perhaps received the group-transmission of the future CLEK key during the first portion 504 of the first CLEK LLE crypto period CLEK1 502 but could not decrypt the GKEK encrypted group-transmission, can individually request the future CLEK key and receive an individual LKEK encrypted unicast transmission of the future CLEK key during the second portion 506.

An indication of the end of the first portion 504 and the start of a second portion 506 of the first CLEK LLE crypto period CLEK1 502 may be indicated via a broadcast transmission, such as and including, a key announcement broadcast OSP. Based on information regarding the number of MSs that have the future CLEK key and the ability to group-transmit the future CLEK key (perhaps in view of current system loading), the length of the first portion 504 and second portion 506 may be preconfigured to be unequal in length, or may be dynamically adjusted based on the authentication controller's ability to get the future CLEK key out to the MSs.

During the second portion 506 of the first CLEK LLE crypto period CLEK1 502, MSs may be configured with a random or preconfigured backoff period to prevent a plurality of individual future CLEK key requests from being transmitted at substantially a same time. In other embodiments, the authentication controller and/or BS(s) under its control may be configured with a random, preconfigured, or system-loading dependent backoff period to provide staggered responses to the individual requests in order to similarly reduce substantial consumption of system resources in fulfilling the individual requests. The authentication controller may also cause a BS under its control (such as BS 201 and/or BS 251 of FIG. 2) to transmit an indication of the end of the second portion 506 of the first CLEK LLE crypto period CLEK1 502, and the beginning of the first portion 510 of the second CLEK LLE crypto period CLEK2 508 (including a renewed indication that individual requests for future CLEK keys will not be entertained at or near the time period 513).

By group-transmitting the future CLEK key (the key associated with the second CLEK LLE crypto period CLEK2 508) during the first portion 504 of the first CLEK LLE crypto period CLEK1 504 (and disallowing individual future CLEK key requests during that time), and allowing individual requests for the future CLEK key during the second portion 506 of the first CLEK LLE crypto period CLEK1 504, the number of individual requests for the current CLEK key during the second CLEK LLE crypto period CLEK2 508 is reduced. System loading at time period 509 when the system transitions from the first CLEK LLE crypto period CLEK1 502 to the second CLEK LLE crypto period CLEK2 508 is also correspondingly reduced.

The first portion 510 of the second CLEK LLE crypto period 508 and the second portion 512 of the second CLEK LLE crypto period 508 follow the same pattern as set forth above with respect to the first portion 504 of the first CLEK LLE crypto period 502 and the second portion 506 of the first CLEK LLE crypto period 502, with the exception that the current CLEK LLE crypto period becomes CLEK2 508 and the future CLEK LLE crypto period becomes CLEK3 514 (along with a new future CLEK key associated with the third CLEK LLE crypto period CLEK3 514).

As illustrated in FIG. 5, the authentication controller may simultaneously track and manage multiple LLE crypto periods. For example, in addition to tracking and managing CLEK LLE crypto periods and key requests in the upper half 501 of the timing diagram 500, the authentication controller may additionally track and manage SLEK LLE crypto periods and key requests having LLE crypto periods overlapping with the CLEK LLE crypto periods. For example, a first SLEK LLE crypto period SLEK1 520 may overlap two CLEK LLE crypto periods CLEK1 502 and CLEK2 508, and may be similarly bifurcated into a first portion 524 during which individual requests for future SLEK keys are disallowed (but during which group key updates may be transmitted) and a second portion 524 during which individual requests for future SLEK keys are allowed and fulfilled. The second SLEK LLE crypto period SLEK2 522 may similarly overlap with CLEK LLE crypto periods CLEK3 514 and CLEK4 516. Although SLEK LLE crypto periods are illustrated in FIG. 5 as having a 2:1 LLE crypto period length compared to CLEK LLE crypto periods, other integer and non-integer ratios could be used as well. Furthermore, similar mechanisms of using key announcement broadcast OSPs to indicate when future SLEK keys can be requested may be used in the SLEK context and similar mechanisms of using authentication response inbound signalling packets (ISPs) to indicate key possession by MSs may be used in the SLEK context. Furthermore, and as already set forth earlier, other types of bifurcated LLE crypto periods having lengths greater than or less than those illustrated in FIG. 5 may be tracked by the authentication controller, including but not limited to, GKEKs and LKEKs.

III. Authentication Controller Enforcement of the Bifurcated LLE Crypto Periods and Tracking of LLE Key Status As set forth in FIG. 6, an authentication controller in accordance with one embodiment is configured to perform a method 600 for enforcing bifurcation of LLE crypto periods and for tracking LLE key status at MSs.

Figure 7:
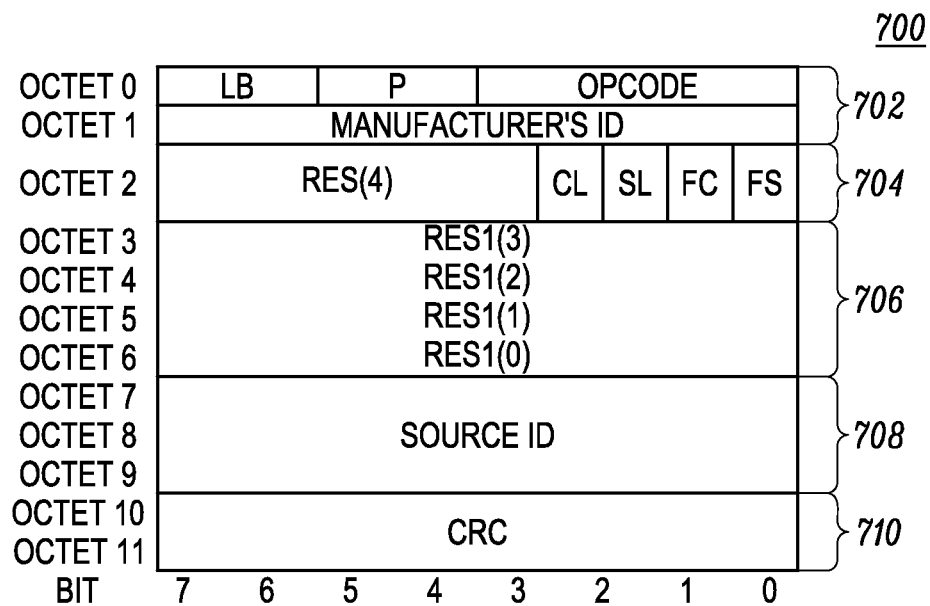
FIG. 7 is a block diagram illustrating an example authorization response inbound signalling packet in accordance with an embodiment.

Method 600 begins at step 602, when the authentication controller authorizes a mobile station for service, and as part of that authorization, receives an authorization response ISP indicating LLE key status. FIG. 7 illustrates an example authorization response ISP data structure 700 that may be transmitted by a MS during the authorization process and received at the authentication controller. As illustrated in FIG. 7, the authorization response ISP data structure 700 is 12 octets long, of which the first two octets 702 include standards specific information such as a last block indicator LB, a protected flag P, an opcode identifying the message type, and a manufacturer's identity MID, perhaps consistent with the P25 standard. The third octet 704 includes a reserved field, and four LLE key indicator fields CL, SL, FC, and FS. The CL field is a one-bit field that may be used to indicate the presence of the current CLEK key at the transmitting MS. The SL field is a one-bit field that may be used to indicate the presence of the current SLEK key at the transmitting MS. The FC field is a one-bit field that may be used to indicate the presence of the future CLEK key at the transmitting MS. The FS field is a one-bit field that may be used to indicate the presence of the future SLEK key at the transmitting MS. By indicating which LLE keys the MS has in its possession via the authorization response ISP, the authentication controller 221 can more quickly provide the current CLEK to the MS, and perhaps determine whether it should delay transition from the first portion of a current CLEK period to a second portion of the current CLEK period if a large number of MSs do not already have the future CLEK key. In the latter case, this could allow the authorization controller to schedule another group key update transmission before transitioning to the second portion of the LLE crypto period (where individual future CLEK key requests are allowed).

The fourth through seventh octets 706 are reserved, the eighth through tenth octets 708 comprise the source ID identifying the transmitting MS, and the eleventh and twelfth octets 710 include a cyclic-redundancy-check (CRC) to verify the authenticity of the authorization response ISP data structure 700 and/or detect transmission errors in the authorization response ISP data structure 700. Although the authorization response ISP data structure 700 provides one vehicle for providing MS LLE key status to the authentication controller, other data structures could also be used.

Figure 6:
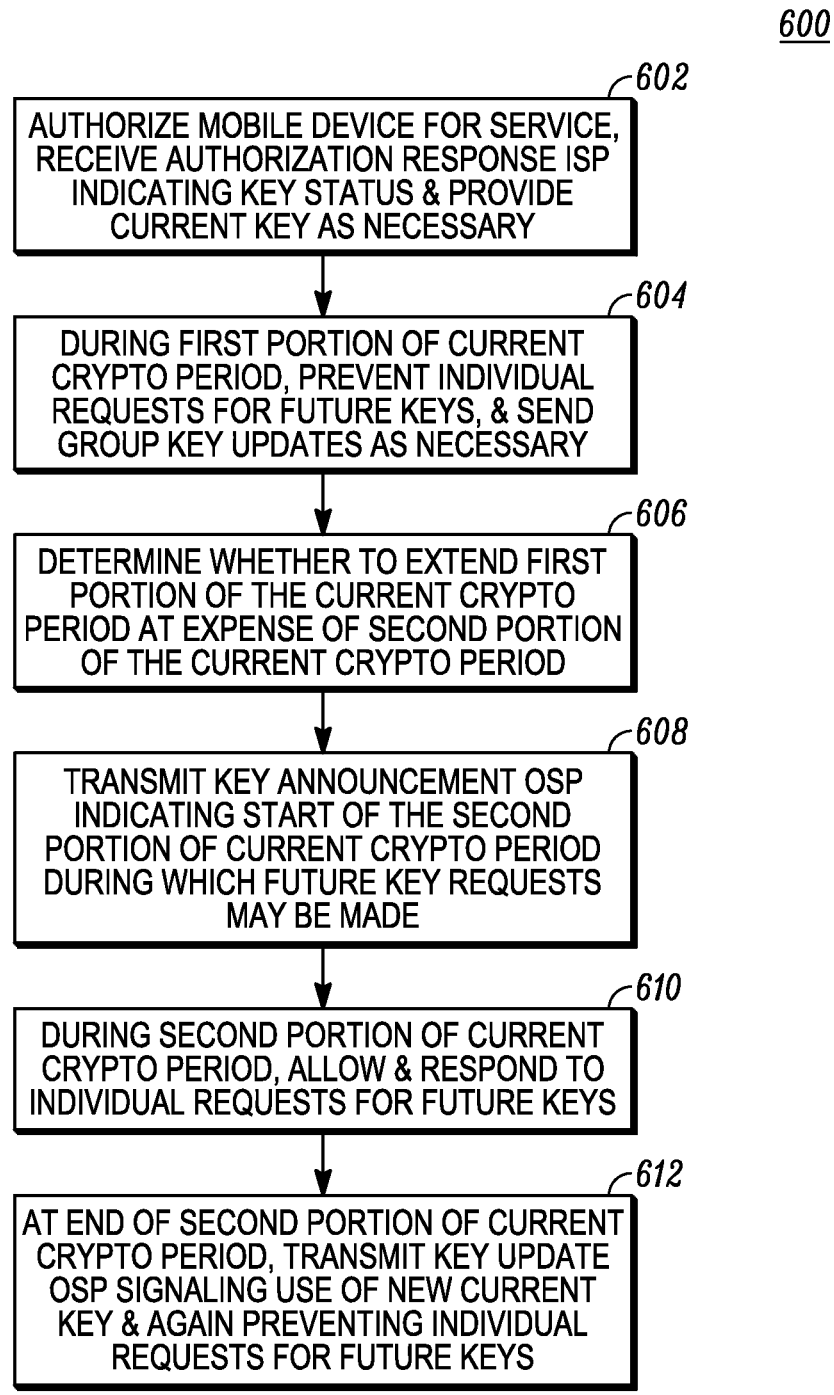
FIG. 6 is a flow chart setting forth an example method of an authentication controller enforcing a bifurcated LLE crypto period in accordance with an embodiment.

Returning to method 600 in FIG. 6, at step 604, and during a first portion of a current LLE crypto period, the authentication controller (i) prevents individual requests for future LLE keys (e.g., actively transmits a denial message to received requests for individual requests for future LLE keys or simply drops/discards the requests), (ii) as necessary or available, sends one or more group key updates containing the future LLE key, and (iii) fulfils individual requests for the current LLE key.

At step 606, the authentication controller determines whether to extend the first portion of the current LLE crypto period at the expense of the second portion of the current LLE crypto period. For example, if the authentication controller determines that a threshold number of MSs operating in the radio network do not have the future LLE key, the authentication controller may extend the first portion of the current LLE crypto period so as to allow more time for an additional one or more LLE group key updates to be transmitted. The threshold may be, for example, a pre-determined integer value based on a known available air-interface bandwidth between MSs and BSs, such as between 5 and 50. Additionally or alternatively, the threshold may be, for example, a relative value such as between 15% and 50% of active or potentially active MSs. Other examples are possible as well.

Accordingly, while in some embodiments the first portion of the LLE crypto period and second portion of the LLE crypto period will remain static between adjacent LLE crypto periods, in other embodiments, the length of a first portion of a first LLE crypto period may differ from the length of a first portion of a second subsequent LLE crypto period.

At step 608, the authentication controller, at a predetermined time or perhaps at an adjusted time consistent with step 606, transmits a broadcast message (such as a key announcement OSP) that includes an indication of the start of the second portion of the current LLE crypto period, during which time individual future LLE key requests may be made by MSs.

Figure 8:
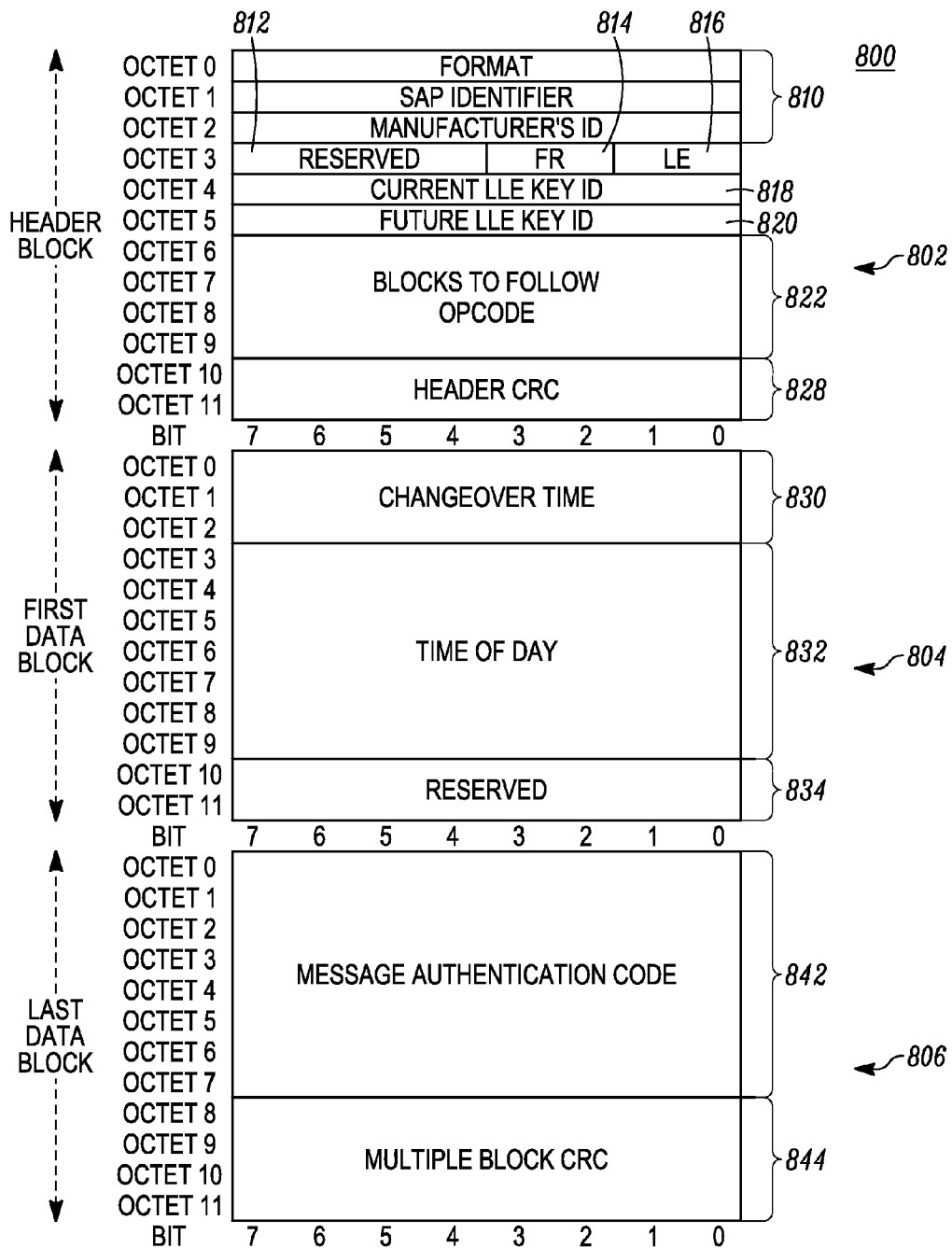
FIG. 8 is a block diagram illustrating an example key announcement outbound signalling packet in accordance with an embodiment.

An example of a key announcement OSP 800 is set forth in FIG. 8. As set forth in FIG. 8, the key announcement OSP 800 may be comprised of three separate data bursts, including a header block 802, a data block 804, and a last data block 806. Although three separate data bursts are shown in FIG. 8, in other examples, more or less than three data bursts may be included in the key announcement OSP. The first three octets 810 of the header block 802 includes standards specific information fields such as a Format block identifying a message type and/or format, an SAP Identifier that indicates a destination of upper layer data, and a manufacturer's identity MID, perhaps consistent with the P25 standard. The fourth octet may include one or more reserved fields 812, a future key allowed field 814, and an LLE encryption enabled field 816. The future key allowed field 814 provides an indication of whether the authentication controller is currently allowing individual requests for future LLE keys (e.g., the field 814 is set to "1" to indicate that individual requests are allowed and/or the system is in or entering the first portion of a current LLE crypto period). The LLE encryption enabled field 816 may provide a mechanism for receiving devices to determine whether LLE is currently enabled on the communications link over which the key announcement OSP was transmitted.

The fifth octet may include a current LLE key (LEK) identifier (e.g., a current CLEK key identifier in one example) field 818 that identifiers which key is currently being used for LLE encryption for transmissions between BSs and MSs. The sixth octet may include a future LLE key identifier (e.g., a future CLEK key identifier in one example) field 820 that identifies which key will be used in a subsequent LLE crypto period for transmissions between BSs and MSs. In an alternative example, the LLE key IDs in fields 818 and 820 may be current and/or future SLEK key identifiers (e.g., identifying current and future backup LLE keys that may or may not be currently in use depending on an operational state of the radio network) or may be current and/or future GKEK key identifiers (e.g., identifying current and future group key update encryption keys), or some combination of the foregoing. In at least one embodiment, more than two fields may be used to indicate more than one type of current and/or future LEK identifier.

The seventh-tenth octets may include additional standards specific information fields 822 such as a blocks to follow field indicating whether additional data bursts follow the header block 802 and an opcode field set to indicate that the current message is a key announcement OSP. The eleventh and twelfth octets may include a CRC field 828 setting forth a CRC value used to verify the authenticity and/or correctness of the header block 802.

The data block 804 includes a changeover time field 830, a time of day field 832, and a reserved field 834. The changeover time field 830 indicates a future time at which the future LLE key indicated in the future LLE key ID field 820 will become the current LEK. While only one changeover time field 830 is illustrated in FIG. 8, in other embodiments, more than one changeover time field may be included in the data block 804 to correspond to more than one current/future LLE key ID pair included in the header block 802. The time of day field 832 includes a time stamp populated by the transmitting device that may be used by the receiving device for synchronization purposes.

The last data block 806 includes a message authentication code field 842 and a CRC field 844. The message authentication code field 842 includes a calculated value that can be used to authenticate the key announcement OSP 800. The CRC field 844 sets forth a CRC value that may be used to verify the correctness of all of the data blocks sent in the key announcement OSP 800.

Returning to method 600 in FIG. 6, at step 610, during the second portion of the current LLE crypto period, MSs may be configured with a random or preconfigured backoff period to prevent all MSs receiving the broadcast message (and that do not already have the future LLE key) from individually requesting the future LLE key substantially simultaneously. In another embodiment, the authentication controller may enforce a random or preconfigured response period in response to received individual requests for the future LLE key to prevent consumption of substantial radio system resources in fulfilling the individual future LLE key requests. Additionally or alternatively, the authentication controller may monitor system loading and queue received individual future LLE key requests and respond to the individual future LLE key requests during the second portion of the current LLE crypto period as system loading allows.

Figure 9:
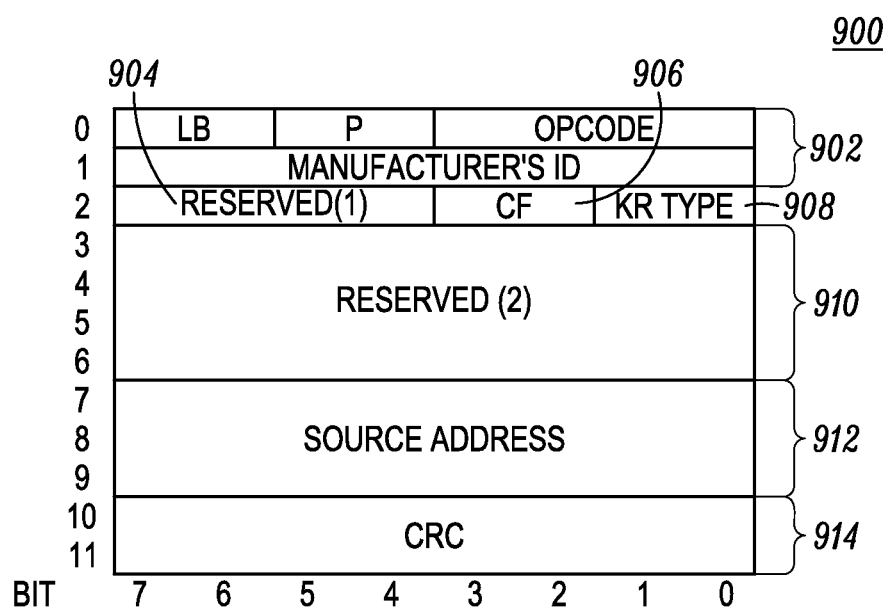
FIG. 9 is a block diagram illustrating an example rekey request inbound signalling packet in accordance with an embodiment.
Figure 10:
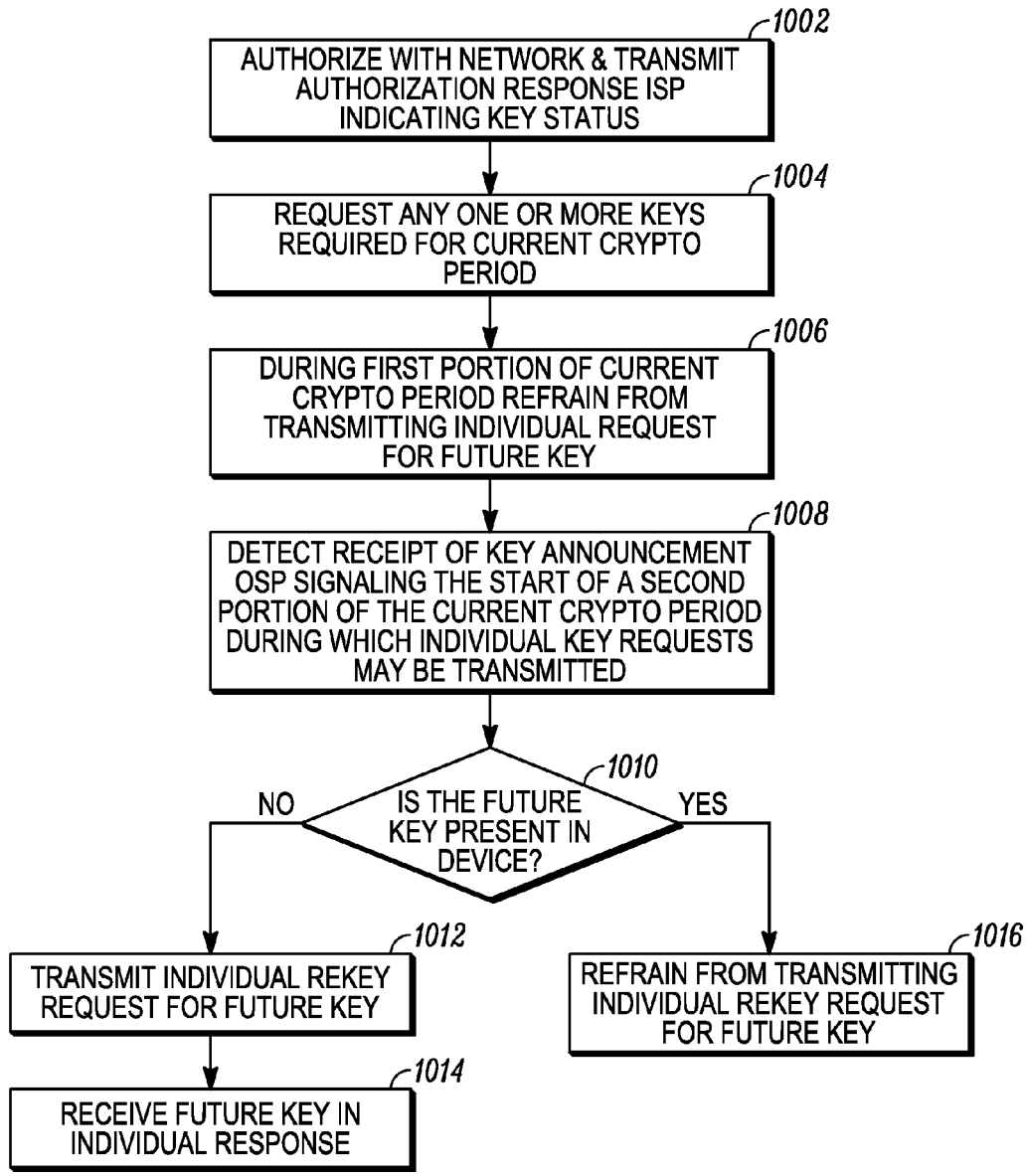
FIG. 10 is a flow chart setting forth an example method of a mobile station implementing a bifurcated LLE crypto period in accordance with an embodiment.

FIG. 9 sets forth an example of an individual rekey request 900 that may be transmitted from a MS to a BS and fulfilled via an authentication controller. As illustrated in FIG. 9, the individual rekey request 900 is 12 octets long, of which the first two octets 902 include standards specific information such as a last block indicator LB, a protected flag P, an opcode identifying the message type, and a manufacturer's identity MID, perhaps consistent with the P25 standard. The third octet includes a reserved field 904, a current/future indicator field 906, and an LLE key request type field 908. The current/future indicator field 906 may be a single bit field that provides an indication of whether the transmitting MS is requesting a current LLE key or a future (next) LLE key. For example, a binary value of "1" may indicate a future LLE key value, and a value of "0" may indicate a current LLE key value. The LLE key request type field 908 may be a double-bit field that indicates a type of LLE key being requested (e.g., CLEK, SLEK, GKEK, etc.). For example, a binary value of "01" may indicate CLEK, while a value of "11" may indicate SLEK. Other possibilities exist as well. An additional reserved field 910 may be included in the individual rekey requests 900, followed by a source address field 912 indicating a source ID of the transmitting MS. The eleventh and twelfth octets 914 include a CRC to verify the authenticity of the individual rekey request 900 message. Although the individual rekey request 900 data structure illustrated in FIG. 9 provides one mechanism for individually requesting LLE key updates to the authentication controller 221, other data structures could additionally or alternatively be used.

Returning to FIG. 6, at step 612, and at or near the end of the second portion of the current LLE crypto period, the authentication controller causes the one or more BSs under its control to transmit another broadcast message (such as another key announcement OSP) that includes an indication of the start of a first portion of a next LLE crypto period, during which time individual future LLE key requests are again disallowed by MSs. For example, a key announcement OSP as set forth in FIG. 8 may be transmitted at step 612, but with the future key request field 814 set to a value (such as "0") indicating that individual requests for future LLE keys are now disallowed. Additionally, the current LLE key ID field 818 may be updated with the future LLE key ID from field 820, and a new future LLE key ID value placed in the future LLE key ID field 820 to identify a new future LLE key. The changeover time field 830 may similarly be updated to indicate when the new (next) LLE crypto period will end.

IV. Mobile Station for Use in a Bifurcated LLE Crypto Period and for Providing LLE Key Status A MS such as MS 205 operating in accordance with authentication-controller enforced bifurcated LLE crypto periods may perform the method 1000 set forth in FIG. 10. At step 1002, the MS registers with and authorizes with a radio network, and during the authorization process, provides an authorization response ISP that indicates an LLE key status at the MS. The authorization response ISP provided by the MS in step 1002 may comply with the example authorization response ISP data structure 700 already described above with respect to FIG. 7.

At step 1004, the MS may request one or more keys required to decrypt communications during a current LLE crypto period. For example, the MS may request one or more of a current CLEK, a current SLEK, or a current GKEK. The MS may use one or more individual rekey requests to request the one or more current LLE keys. The individual rekey request provided by the MS in step 1004 may comply with the example individual rekey request 900 structure already described above with respect to FIG. 9. In at least one alternative embodiment, the MS may be automatically provided with the current LLE keys necessary to decrypt communications during the current LLE crypto period in response to the key status indicators provided in the authorization response ISP in step 1002 indicating that the MS does not have the necessary LLE keys.

At step 1006, the MS, during a first portion of a current LLE crypto period, refrains from transmitting individual rekey requests for future LLE keys. The MS may be informed of whether it can transmit individual rekey requests (e.g., whether the system is currently in the first portion or the second portion of the current LLE crypto period) via a broadcast message (such as a key announcement broadcast consistent with the structure set forth in FIG. 8 above) or via some other communication during the authorization process of step 1002.

At step 1008, the MS detects receipt of a broadcast message (such as a key announcement broadcast consistent with the structure set forth in FIG. 8 above) signalling the start of a second portion of the current LLE crypto period during which individual rekey requests may be transmitted and fulfilled by the authentication controller.

At step 1010, the MS determines whether or not it already has the future LLE key for the next LLE crypto period. If it does, processing proceeds to step 1016 during which the MS refrains from transmitting an individual rekey request for the future LLE key. If, on the other hand, the MS does not have the future LLE key, processing proceeds to step 1012 during which time the MS transmits an individual rekey request for the future LLE key for the next LLE crypto period. In one embodiment, the MS may, after detecting receipt of the key announcement OSP at step 1008 and determining that it does not have the future LLE key at step 1010, apply a random or predetermined backoff period before transmitting the individual rekey request at step 1012, in order to avoid a situation in which many MSs simultaneously request a rekey, which could cause system performance degradation.

At step 1014, the MS receives the future LLE key via a unicast, LKEK key encrypted transmission from its serving BS.

In light of the foregoing, and by providing a mechanism for a MS to indicate LLE key status during authorization and an authentication controller to bifurcate an LLE crypto period into a first portion during which individual key requests for future LLE keys are disallowed and a second portion during which individual key requests for future LLE keys are allowed, a system for rekeying may be implemented that reduces over-the-air bandwidth requirements, prevents substantial delays and performance degradation, and more intelligently distributes new keys. Other benefits are possible as well.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises ... a", "has ... a", "includes ... a", "contains ... a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method of rekeying radios for link layer encryption (LLE) in a radio network comprising a plurality of network locations, the method comprising, at a radio network communications device:

during a first portion of a first LLE crypto period during which a first LLE key (LEK) is used to LLE encrypt inbound and outbound communications between a base station and mobile stations operating within a corresponding coverage area of the base station, preventing individual ones of the mobile stations from requesting a second LEK to be used during a second LLE crypto period after the first LLE crypto period; and during a second portion of the first LLE crypto period, allowing individual ones of the mobile stations to request the second LEK.

2. The method of claim 1, further comprising, during the first portion of the first LLE crypto period, allowing individual ones of the mobile stations to request the first LEK and, in response to a request for the first LEK from a particular one of the mobile stations, providing the first LEK to the particular one of the mobile stations encrypted with a link layer key encryption key (LKEK) unique to the particular one of the mobile stations.

3. The method of claim 1, further comprising receiving a plurality of indications from particular ones of the mobile stations, via authentication response outbound signalling packets transmitted by the particular ones of the mobile stations during authentication, of whether the particular ones of the mobile stations are currently in possession of the first and/or second LEKs.

4. The method of claim 3, further comprising determining, based at least in part on how many of the particular ones of the mobile stations are not already currently in possession of the second LEK, whether to provide the second LEK during the first LLE crypto period using a group key update transmission.

5. The method of claim 4, wherein the group key update transmission is one of a multicast and broadcast transmission.

6. The method of claim 5, further comprising determining to provide the second LEK during the first portion of the first LLE crypto period using the group key update transmission and providing the second LEK during the first LLE crypto period using a group key update transmission, wherein the group key update transmission is LLE encrypted using a group key link layer encryption key (GKEK) that is shared by the mobile stations to enable group key updates.

7. The method of claim 4, further comprising determining, based at least in part on how many of the particular ones of the mobile stations are not already currently in possession of the second LEK, whether to extend a length of the first portion of the first LLE crypto period and correspondingly reduce a length of the second portion of the first LLE crypto period.

8. The method of claim 7, further comprising determining to extend the first portion of the first LLE crypto period and correspondingly reduce the second portion of the first LLE crypto period by delaying a transmission of a key announcement broadcast outbound signalling packet indicating that individual future LLE key requests are allowed.

9. The method of claim 1, further comprising receiving, during the first portion of the first LLE crypto period, an individual request for the second LEK, and responsive to receiving the individual request, one of dropping the request without replying and replying with a message denying the request.

10. The method of claim 1, further comprising receiving, during the second portion of the first LLE crypto period, an individual request for the second LEK, and responsive to receiving the individual request, providing the second LEK to the particular one of the mobile stations encrypted with a link layer key encryption key (LKEK) unique to the particular one of the mobile stations.

11. The method of claim 1, wherein the first and second LEKs are one of (i) first and second common link layer encryption keys (CLEKs) used to LLE encrypt inbound and outbound communications between the base station and the mobile stations operating within the corresponding coverage area of the base station during normal operation, and (ii) first and second static link layer encryption keys (SLEKs) used to LLE encrypt inbound and outbound communications between the base station and the mobile stations operating within the corresponding coverage area of the base station when network connectivity between the base station and the radio network communications device is reduced or eliminated.

12. The method of claim 1, wherein the radio network communications device is one of a zone controller and an authentication controller.

13. The method of claim 1, wherein the base station and mobile stations communicate over an air interface in accordance with a P25 protocol.

14. A radio network communications device in a radio network comprising a plurality of network locations, the radio network communications device comprising:
a transceiver;
a processor; and
a non-transitory computer readable medium having instructions stored thereon that, in response to execution by the processor, cause the radio network communications device to perform operations comprising:
during a first portion of a first LLE crypto period during which a first LLE key (LEK) is used to LLE encrypt inbound and outbound communications between a base station and mobile stations operating within a corresponding coverage area of the base station, preventing individual ones of the mobile stations from requesting a second LEK to be used during a second LLE crypto period after the first LLE crypto period; and
during a second portion of the first LLE crypto period, allowing individual ones of the mobile stations to request the second LEK.

15. A method of rekeying radios for link layer encryption (LLE) in a radio network comprising a plurality of network locations, the method comprising, at a mobile station:
during a first portion of a first LLE crypto period during which a first link layer encryption key (LEK) is used to LLE encrypt inbound and outbound communications between a base station and the mobile station operating within a corresponding coverage area of the base station, refraining from requesting a second LEK to be used during a second LLE crypto period after the first LLE crypto period; and
during a second portion of the first LLE crypto period, and responsive to determining that the mobile station was not pre-provisioned with the second LEK and was not provided the second LEK during the first portion of the first LLE crypto period, transmitting an individual request for the second LEK over an air interface to the base station.

16. The method of claim 15, wherein the beginning of the second portion of the first LLE crypto period is determined responsive to receiving, from the base station via the air interface, a key announcement broadcast outbound signalling packet indicating that individual future LLE key requests are allowed.

17. The method of claim 15, further comprising, responsive to receiving the second LEK during the first portion of the first LLE crypto period via a group key update transmission, refraining from transmitting the request for the second LEK during the second portion of the first LLE crypto period.

18. The method of claim 17, wherein the group key update transmission is LLE encrypted using a group key link layer encryption key (GKEK) that is shared by a plurality of mobile stations operating within the corresponding coverage area of the base station to enable group key updates.

19. The method of claim 18, wherein the group key update transmission is one of a multicast and broadcast transmission.

20. The method of claim 15, wherein the first and second LEKs are one of (i) first and second common link layer encryption keys (CLEKs) used to LLE encrypt inbound and outbound communications between the base station and the mobile stations operating within the corresponding coverage area of the base station during normal operation, and (ii) first and second static link layer encryption keys (SLEKs) used to LLE encrypt inbound and outbound communications between the base station and the mobile stations operating within the corresponding coverage area of the base station when network connectivity between the base station and the radio network communications device is reduced or eliminated.

21. The method of claim 15, wherein the base station and mobile station communicate over an air interface in accordance with a P25 protocol.

22. The method of claim 15, further comprising, during authentication, transmitting an authentication response outbound signalling packet to the base station indicating whether the mobile station is currently in possession of the first and/or second LEK.

23. A mobile station in a radio network comprising a plurality of network locations, the mobile station comprising:
- a wireless transceiver;
- a processor; and
- a non-transitory computer readable medium having instructions stored thereon that, in response to execution by the processor, cause the mobile station to perform operations comprising:
    - during a first portion of a first LLE crypto period during which a first link layer encryption key (LEK) is used to LLE encrypt inbound and outbound communications between a base station and the mobile station operating within a corresponding coverage area of the base station, refraining from requesting a second LEK to be used during a second LLE crypto period after the first LLE crypto period; and
    - during a second portion of the first LLE crypto period, and responsive to determining that the mobile station was not pre-provisioned with the second LEK and was not provided the second LEK during the first portion of the first LLE crypto period, transmitting an individual request for the second LEK over an air interface to the base station.

* * * * *